Patented Feb. 1, 1949

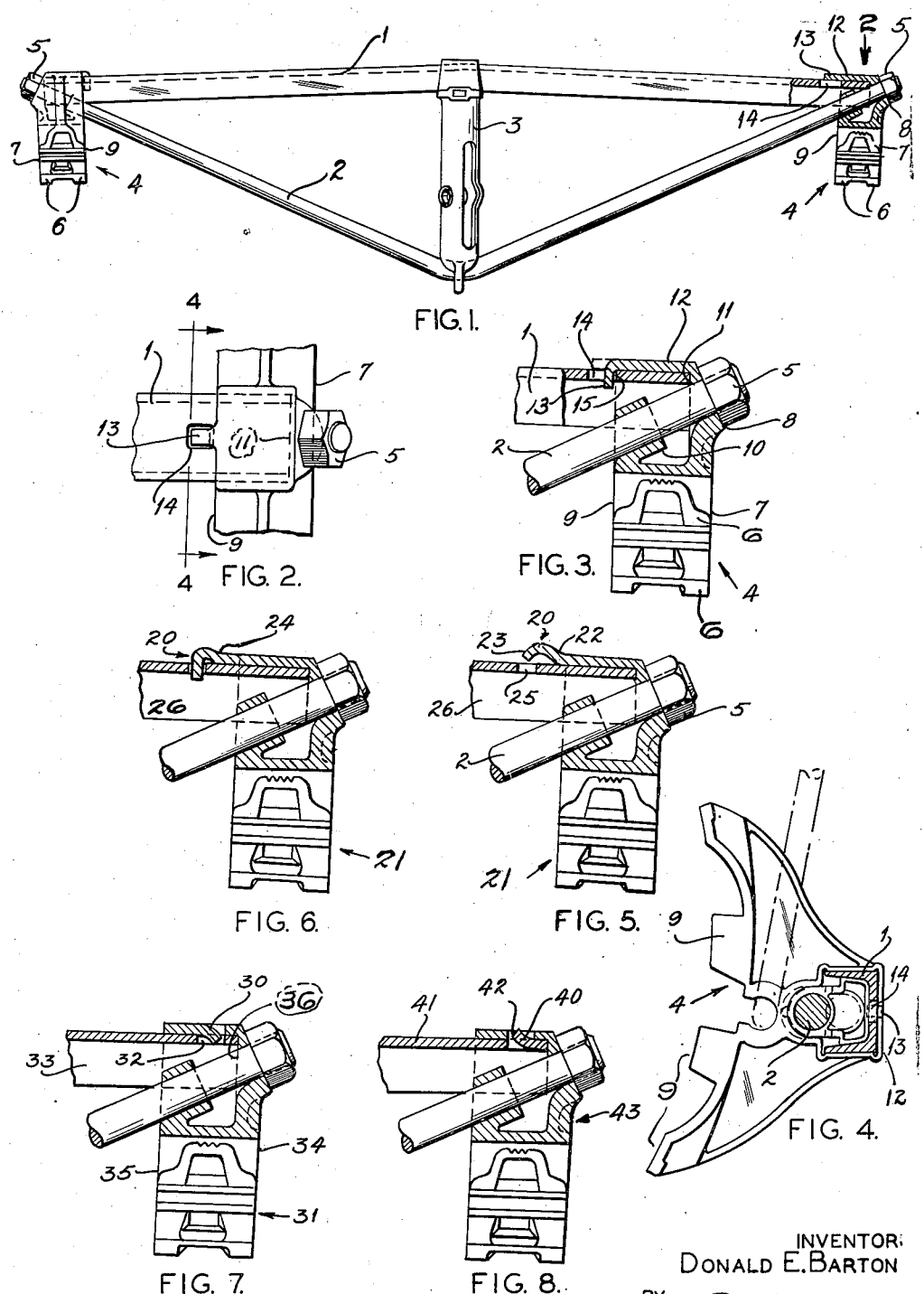

2,460,670

UNITED STATES PATENT OFFICE 2,460,670

RAILWAY BRAKE BEAM STRUCTURE

Donald E. Barton, Chicago, Ill., assignor to Chicago Railway Equipment Company, Chicago, Ill., a corporation of Illinois Application May 11, 1946, Serial No. 669,145

12 Claims. (Cl. 188—224.1)

The invention relates to railway brake beams of the truss type and consists in structure for maintaining the assembly of the compression member, the tension member and the brake head.

In a usual truss type brake head, the head is seated on the end of the compression member and has a bearing on its outer face for a nut threaded on the end of the tension rod which passes through the brake head. If the nut works off or if the tension rod fails, the head may move from the compression and tension members. In such event, if the only support for the beam is the usual swing hanger, received in the head, the beam may fall to the track and may cause serious damage to the truck and even wreck the train.

The main object of the invention is to maintain the assembly of the beam in the event of failure of the tension rod or the nut thereon.

It is a further object of the invention to provide safety retainers for the head and other beam members which will be simple, inexpensive and effective for the intended purpose indicated.

These and other detail objects are attained by the structure illustrated in the accompanying drawings, in which:

Figure 1 is a top view of a railway truss type brake beam embodying one form of the invention, the right hand end being sectioned and showing the parts before the safety retainer is effective.

Figure 2 is a detail vertical view looking in the direction of the arrow 2 in Figure 1 and drawn to an enlarged scale.

Figure 3 is a section corresponding to the right hand end of Figure 1 but showing the safety retainer in functioning position.

Figure 4 is a detail vertical section taken transversely of the beam on the line 4—4 of Figure 2.

Figure 5 corresponds to the right hand end of Figure 1 but illustrates another form of the invention.

Figure 6 corresponds to Figure 3 but illustrates the structure shown in Figure 5 with the safety retainer in functioning position, and Figures 7 and 8 correspond to Figures 3 and 6 but illustrate different forms of the invention, respectively.

The beam illustrated in Figures 1-4 includes a channel-shaped compression member 1, a round tension member 2, a strut 3 intermediate the ends of the beam, brake heads 4 mounted on the converging ends of the compression and tension members, and tensioning nuts 5 threaded on the ends of the tension member. Each head 4 includes the usual elements 6 facing forwardly of the beam and supporting the usual brake shoe (not shown). The outer side 7 of the head has a bearing 8 for nut 5. The inner side 9 of the head preferably, but not necessarily, includes a sleeve 10 which encircles tension rod 2 and tends to limit play of tension rod relative to compression member 1. The head is recessed inwardly from its inner side 9 to receive the end portion of compression member 1 and the end of the latter is seated at 11.

All of the above described features correspond to well known structure. The head back wall 12 is provided with an integral lug 13 which extends inwardly from the end of the beam and projects beyond the inner side 9 of the brake head. The adjacent portion of compression member 1 is provided with an aperture 14 arranged to receive lug 13 when the latter is bent from the position shown in Figure 1 to the position shown in Figure 3 and in the latter-mentioned position, it opposes seat 11 and the similarly facing end 15 of aperture 14 and prevents withdrawal of the head from the compression member irrespective of the presence of nut 5.

The structures shown in Figures 5 and 6 closely resemble that described above but the lug 20 on a head 21 is originally inclined rearwardly at 22 and then forwardly at 23 in the arcuate form shown in Figure 5. In driving the lug into operative position as shown in Figure 6, there is less pronounced bending of the lug about its bending line, as indicated 24, and the extreme end of the lug which enters the aperture 25 in compression member 26 is not bent at all. This arrangement tends to reduce the likelihood of fracture of the lug in the event the head casting is not thoroughly annealed about the lug.

Figure 7 shows a similar structure except that the lug 30 on head 31, and the aperture 32 therefore in compression member 33, are positioned intermediate the head sides 34 and 35 and the lug extends in the opposite direction from that indicated in the figures previously described. However, the bent lug opposes the seat 36 near the end of the compression member and functions similarly to the lugs previously described.

Figure 8 shows another arrangement in which the bendable lug 40 is provided on compression member 41 and is received in an aperture 42 provided in the brake head 43. Lug 40 may be bent outwardly into the position shown by inserting a rod or similar tool through the open end of the recess which receives the compression member.

It will be understood that the safety retainers here illustrated are not intended to take the place of the tensioning nuts for resisting the thrusts exerted longitudinally of the beam when the brakes are applied and released but they will prevent the head from being moved from the remaining beam parts and the resultant dropping of the parts to the rail.

The safety retainers may be varied in detail otherwise than as shown without departing from the spirit of the invention and may be incorporated in a compression member of bar, U-section or other shape, and the exclusive use of those modifications of the illustrated structure and coming within the scope of the claims is contemplated.

What is claimed is:

1. In a railway truss type brake beam including a compression member and a tension rod with their end portions converging, a brake head member receiving said end portions, and a device on the end of the tension rod thrusting the brake head member against the end of the compression member, and an element integral with one of said members and interlocking with a part of the other member and preventing disassembly of said members.

2. In a railway truss type brake beam including a compression member and a tension rod with their end portions converging, a brake head member receiving said end portions, one of said members having a bendable lug and the other of said members having an opening into which said lug extends, when bent over, and prevents disassembly of said members.

3. In a railway truss type brake beam including a compression member and a tension member with their end portions converging, a brake head receiving said end portions, and a device on the end of the tension member thrusting the brake head against the end of the compression member, a bendable element on the head, the compression member being provided with an aperture receiving a portion of said element to hold the head against removal from the compression member.

4. In a railway truss type brake beam including a compression member having an aperture spaced inwardly from the end of the beam, a tension member, the end portions of said compression and tension members converging, a brake head having sides facing towards and away from the end of the beam respectively, the head also having elements for mounting a brake shoe facing transversely of the beam, there being a recess opening inwardly of the head from the side facing away from the end of the beam, said recess being at the rear of said elements and receiving the end portion of the compression member, the rear of the head forming a wall of said recess and having a lug extending away from the end of the beam beyond the head side facing away from the end of the beam and bent into said aperture to retain the head against removal from the compression member.

5. In a railway truss type brake beam including a compression member and a tension member with their end portions converging, a brake head receiving said portions, and a device on the end of the tension member thrusting the brake head against the end of the compression member, a bendable element on the compression member, the head being provided with an aperture receiving a portion of said element to hold the head and compression member against disassembly.

6. In a railway truss type brake beam including a compression member and a tension member with their end portions converging, a brake head receiving said end portions, and a device on the end of the tension member thrusting the brake head against the end of the compression member, there being an aperture between the head sides, and the compression member having an element accessible through the open end of said recess in the head and bendable by a tool inserted through said recess so as to enter said aperture.

7. In a railway truss type brake beam including a compression member and a tension member with their end portions converging, a brake head receiving said end portions, and a device on the end of the tension member thrusting the brake head against the end of the compression member, there being a tension member receiving sleeve at the side of the head spaced from said device, a bendable lug on the head spaced from said device a greater distance than said sleeve, the compression member being provided with an aperture similarly spaced from said device and receiving a portion of said element to hold the head against removal from the compression member.

8. In a railway truss type brake beam including a compression member and a tension member with their end portions converging, a brake head receiving said end portions, and a device on the end of the tension member thrusting the brake head against the end of the compression member, there being a tension member receiving sleeve at the side of the head spaced from said device, a bendable lug on the head intermediate the sides thereof, the compression member being provided with an aperture intermediate the sides of the head and receiving a portion of said element to hold the head against removal from the compression member.

9. A railway brake head having a recess arranged to receive the end portion of a beam compression member, and having an aperture for a beam tension member, one side of the head forming a seat for the end of such member and a bearing for a tensioning device, there being a lug on the head spaced from said seat and bendable into a position to face in the direction opposite to that faced by said seat.

10. A railway brake head having a part arranged to mount a brake shoe and to receive and seat the end of a beam compression member and having a bearing at one side for a tensioning device, and a lug projecting from the other side of the body and bendable to oppose said latter mentioned side.

11. A railway brake head comprising a body, the front of which is arranged to mount a brake shoe and having a recess extending inwardly from one side for receiving the end portion of a beam compression member, the inner end of the recess forming a seat for the end of the member, there being a bearing on the outer face of the opposite side of the head for a tensioning device, and a lug on the rear of the body projecting beyond the first-mentioned side of the body and bendable parallel with the side of the body to oppose said seat.

12. A railway brake head having a recess arranged to receive the end portion of a beam compression member, and having an aperture for a beam tension member, one side of the head forming a seat for the end of such a beam compression member and a bearing for a tensioning device, the head including a sleeve for receiving a beam tension rod, there being a lug on the head spaced from said seat a greater distance than said sleeve and bendable into a position to face in the direction opposite to that faced by said seat.

DONALD E. BARTON.

REFERENCES CITED

The following references are of record in the file of this patent:

UNITED STATES PATENTS

| Number | Name | Date |
|---|---|---|
| 448,929 | Sceets | Mar. 24, 1891 |
| 2,116,594 | Busch | May 10, 1938 |
| 2,206,676 | Schaefer | July 2, 1940 |
| 2,419,115 | Busse | Apr. 15, 1947 |